No. 649,361. Patented May 8, 1900.
L. RUST.
LETTERING DEVICE.
(Application filed Sept. 8, 1899.)
(No Model.)
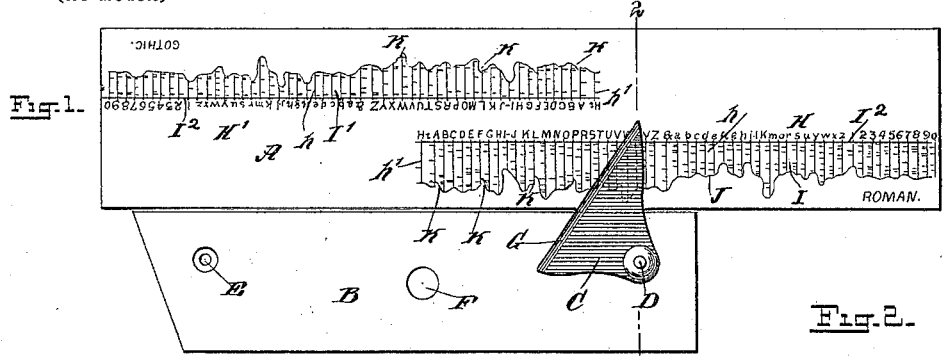
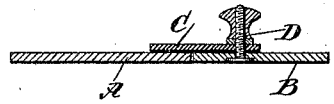
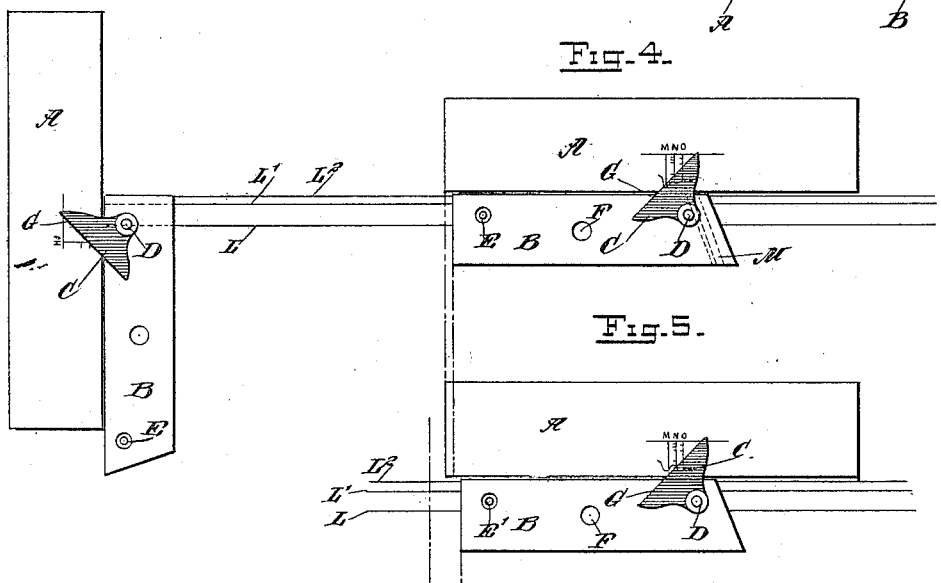
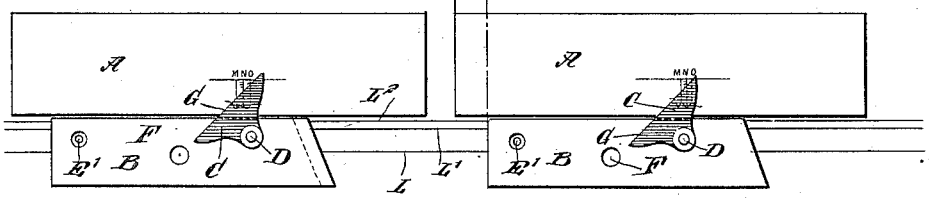
WITNESSES:
Geo. W. Naylor
H. L. Reynolds.
INVENTOR
L. Rust
BY
ATTORNEYS

UNITED STATES PATENT OFFICE.

LUCIAN RUST, OF CLEVELAND, OHIO.

LETTERING DEVICE.

SPECIFICATION forming part of Letters Patent No. 649,361, dated May 8, 1900.

Application filed September 8, 1899. Serial No. 729,864. (No model.)

*To all whom it may concern:*

Be it known that I, LUCIAN RUST, of Cleveland, in the county of Cuyahoga and State of Ohio, have invented a new and Improved Lettering Device, of which the following is a full, clear, and exact description.

My invention relates to an improvement in devices for laying out letters and designed particularly for draftsmen's use, and comprises the novel features hereinafter described and claimed.

Reference is to be had to the accompanying drawings, forming a part of this specification, in which similar characters of reference indicate corresponding parts in all the figures.

Figure 1 shows a plan view of my device. Fig. 2 is a section on the line 2 2 of Fig. 1. Fig. 3 shows my device in use for locating the horizontal lines of a row of letters. Figs. 4, 5, 6, and 7 show the device in use for locating the vertical lines and points of letters.

The object of my invention is to produce a simple and cheaply-manufactured device which may be used for accurately laying out letters upon drawings and for similar work where accurate and nice execution is desired.

The device consists of two principal parts—a scale member A and a ruler member B. The scale member A has one or more scales laid out upon the face thereof, each scale being designed for producing a certain character of letter.

The device, as shown in the drawings, has two scales I and I' laid out thereon, one designed for producing Roman characters and the other for producing Gothic characters. It is evident that the scale member may be provided with as many of these scales as desired. The ruler member consists of the ruler proper, B, which is a comparatively-small piece of wood, hard rubber, or any similar material such as would be suitable for this purpose, and the registering arm or limb C, which is secured to the ruler member B, preferably near one end. This arm or limb is also preferably mounted upon a pivot, so that it may be turned to various angles, as desired, and is herein shown as secured to the ruler B by means of a bolt and thumb-nut D. The ruler is herein shown as provided with two holes E and E', located one near each end of the ruler, so that the arm C may be shifted to either end of the ruler. The scales I and I' consist of a series of letter-lines $h$ and $h'$, which extend in a direction transversely of the length of the scale. Each of these lines is designed for use in connection with one or, in some cases, more letters, and each line is provided with a series of marks adapted to represent the horizontal location of the principal points and lines of its particular letter or letters. Each line represents a single letter, excepting in those cases in which the horizontal location of the principal points and lines of two letters correspond—as, for instance, in the lower-case letters "i," "j," and "l" these points are the same in all. The same is also true of the lower-case letters "b" and "p" and the lower-case letters "f" and "t" and the lower-case letters "d" and "q." In these cases the same line may be used for more than one letter. A datum-line $I^2$ is preferably run longitudinally of the scale and intersects one end of all of the letter-lines $h$ $h'$. The intersection of this datum-line $I^2$ with the upper ends of the letter-lines indicates the left-hand margin of the space which is to be devoted to that particular letter. The other points which are to be used are indicated by the marks previously referred to, which in the scale, as shown, consist of short lateral lines. The lower ends of the letter-lines are herein shown as being connected by a waved or curved line, the intersection of said waved line with the lower ends of the letter-lines indicating the right-hand margin of the space to be used in connection with said letter. It will be noticed that this waved line is broken at certain points, (indicated by the reference-letter K.) The letter-lines where this waved line is broken are those representing letters having one or more sloping sides—as, for instance, the letters "A," "F," "L," "P," "V," and "W."

In spacing the letters it is desirable in order to produce a proper effect that letters of this character when placed next to each other and when the slope of the adjacent sides of the letters is in the same direction be placed closer together than would occur if an invariable spacing were used—as, for instance, if the letters "A" and "W" were made consecutively the space between the two should be reduced in amount or it would appear to be much greater than the other spaces. The break in the waved line indicates this condition, so that the draftsman when using the device will be reminded of the fact and will omit that portion of the spacing which lies between the upper and lower intersections of the waved line with the letter-line. The space between the extremities of each letter-line, as indicated by the two lines I² and J, and the end marks on said lines indicate the spacing which is to be provided for between adjacent letters. In cases where two letters of the character mentioned come together the spacing between the two intersections of the waved line with the letter-line should be omitted.

My device is to be used as follows: The first operation in making a row of letters is to locate the horizontal lines representing the top and bottom of the upper-case letters and the top of the lower-case letters, said lines being represented in the drawings by the letters L, L², and L'. It will be noticed that at one end of each of the scales there is one line which is labeled "Ht." This line is to be used in laying out the height of the letters. The manner of doing this is shown in Fig. 3. The scale A is placed in a vertical position or so as to extend across the line of letters at right angles. The ruler B is placed with one edge against the edge of the scale, with the arm or limb C extending over the top of the scale in the manner shown in the figure. The edge G, which is the registering edge of the arm C, is placed so as to register with one end mark upon the line which is labeled "Ht." This should be done at the same time that the upper end of the ruler is upon the point where the top of the line of letters is desired. This point is indicated by making a pencil-mark upon the drawing, and the ruler is then moved downward, sliding along the edge of the scale, which is held stationary until the registering edge of the arm C crosses the line at the intermediate division. The upper end of the ruler is then in position for indicating the top of the lower-case letters, and this line is then indicated by a pencil-mark upon the paper. The ruler is then moved down until the registering edge of the arm C registers with the opposite end of said line, when the point of the lower edge of the letters is indicated by the upper end of the ruler. In order to lay out the letters upon said line, the scale A is then placed parallel with the lines L, L', and L² and at a slight distance therefrom. The ruler is then placed in contact with the lower edge of the scale, after the manner shown in Fig. 4. The end of the ruler is placed where the first letter is to begin. The scale is then moved along the ruler until the upper end of the line representing the letter desired is in exact registry with the edge of the arm C. The scale is then held stationary and the ruler is moved to the right until the registering edge of the arm is in registry with the first mark upon said line. A mark is then made upon the paper, which indicates one point of the letter. The scale is held stationary and the ruler moved until it is in succession placed in registry with each of the marks for that letter-line. The last space upon said letter-line which lies between the outermost mark upon the line and the waved line J indicates a portion of the spacing which is to be provided for between adjacent letters. It is not necessary to make a mark upon the paper for this point in the line. The scale is then moved until the upper end of the line corresponding with the next letter to be produced is in registry with the edge of the arm C. The ruler is then moved along, the scale being held stationary, until the upper point upon said line is in registry with the edge of the arm C. This represents the remainder of the spacing between the two letters and is the first point upon the line which is to be marked upon the paper. In this way the device is to be used for the various letters and figures.

The scale being laid out very accurately, the letters produced will be correspondingly accurate and all of exactly the same proportion.

The device may be adjusted for producing letters of various sizes by simply adjusting the relative angle of the registering edge of the arm C and the scale. If a larger letter is desired, the arm is turned so as to make a larger angle with the letter-line or away from the perpendicular, while if a smaller letter is desired it is moved nearer to the perpendicular.

It will be noticed that the two ends of the ruler are different, one end being at right angles to the sides, while the other end is sloping. The object of this is to enable the device to be used for making vertical and inclined or italicized letters. If the arm C is attached to the right-angled end of the ruler, as shown in Figs. 1 and 3, ordinary or vertical letters will be produced. If, however, it is attached to the other end of the ruler, sloping or italicized letters will be produced. Whether these letters slope forward or backward will depend upon which side of the ruler the arm is secured to. As shown in Fig. 4 the letters would be backward-sloping letters, while if the ruler were turned the other side up and the arm attached to the same end the letters would be italics or sloped forwardly. If it is desired to make elongated letters—that is, letters which are relatively taller than the standard—this may be done by inclining the arm C more nearly to the perpendicular after the spacing-lines L, L', and L² have been laid out. If it is desired to make compressed letters—that is, letters which are relatively broader than the standard—this may be done by inclining the arm C away from the perpendicular after the spacing-lines L, L', and L² have been laid out upon the paper.

The ruler B is provided, as before stated, with holes E and E', located near each end, adapted to receive the clamping-bolt D, by which the arm C is held in place. The ruler is also provided with one or more holes F, located, preferably, upon its center line, by which it is possible to more firmly engage and move the ruler than if a smooth surface is left.

It is evident that this device may be used for accurately laying out letters of any size and relative proportions. It is exceedingly simple and cheap to manufacture, thus making it possible for all draftsmen to obtain it, even if they have but comparatively little use for it. It may also be rapidly used and makes it possible to do such work as lettering both in a better manner and more rapidly than by the process ordinarily employed.

Having thus fully described my invention, I claim as new and desire to secure by Letters Patent—

1. A lettering device, comprising a scale having a straight edge and a face with letter-lines thereon, at an angle to the edge, the said lines being each provided with marks representing the relative horizontal position of the principal points and lines of said letter, and a ruler having an edge for engaging said scale edge and an arm adapted to extend over the scale and provided with an edge adapted to intersect the letter-lines at an angle, substantially as described.

2. A lettering device, comprising a scale having a straight edge and a face with letter-lines thereon perpendicular to the edge, each provided with marks representing the relative horizontal position of the principal points and lines of said letter, and a ruler having an edge engaging said scale and an arm adapted to extend over the scale and provided with an edge adapted to intersect the letter-lines at an angle, the ends of said ruler forming the working faces thereof and being one at right angles to its sides and the other at a different angle, substantially as described.

3. A lettering device, comprising a scale having a straight edge and a face with letter-lines thereon perpendicular to the edge, each provided with marks representing the relative horizontal position of the principal points and lines of said letter, and a ruler having an edge engaging said scale and an arm adjustably pivoted thereon and adapted to extend over the scale and provided with an edge adapted to intersect the letter-lines at an angle, substantially as described.

4. A lettering device, comprising a scale having a straight edge and a face with letter-lines thereon perpendicular to the edge, each provided with marks representing the relative horizontal position of the principal points and lines of said letter, and a ruler having an edge engaging said scale and an arm adjustably pivoted thereon and adapted to extend over the scale and provided with an edge adapted to intersect the letter-lines, the ends of said ruler forming the working faces thereof and being one at right angles to the sides and the other at a different angle, substantially as described.

5. A lettering device, comprising a scale having a straight edge and a face with letter-lines thereon perpendicular to the edge, each provided with marks representing the relative horizontal position of the principal points and lines of said letter, and a ruler having an edge engaging said scale and an arm adjustably pivoted thereon and adapted to extend over the scale and provided with an edge adapted to intersect the letter-lines at an angle, the ends of said ruler forming the working faces thereof and being at different angles to the sides thereof and the arm being attachable to either end of the ruler, substantially as described.

LUCIAN RUST.

Witnesses:
C. R. GAULT,
CARL R. APTHORP.